United States Patent [19]

Tanaka et al.

[11] Patent Number: 4,897,744
[45] Date of Patent: Jan. 30, 1990

[54] APPARATUS FOR SELECTIVELY LOADING SMALL OR LARGE TAPE CASSETTES

[75] Inventors: Tetsuro Tanaka, Hirakata; Jirou Kajino, Neyagawa; Yoshiyuki Shimizu, Osaka; Fuminari Saito, Hirakata; Hironori Honsho, Neyagawa, all of Japan

[73] Assignee: Matsushita Electric Industrial Co., Ltd., Osaka, Japan

[21] Appl. No.: 197,402

[22] Filed: May 23, 1988

[30] Foreign Application Priority Data

May 29, 1987 [JP] Japan ................................. 62-135064
May 29, 1987 [JP] Japan ................................. 62-135175
Jun. 25, 1987 [JP] Japan ................................. 62-158209

[51] Int. Cl.$^4$ ............................................. G11B 15/00
[52] U.S. Cl. ........................................................ 360/94
[58] Field of Search .................................. 360/94, 85; 242/197–201

[56] References Cited

U.S. PATENT DOCUMENTS 4,479,618 10/1984 Okada et al. .
4,580,183  4/1986 Maeda ................................. 360/94
4,590,528  5/1986 Tsuruoka ............................ 360/94
4,622,605 11/1986 Tsuruoka et al. .

FOREIGN PATENT DOCUMENTS 59-193502 11/1984 Japan .
59-195369 11/1984 Japan .
59-195370 11/1984 Japan .
59-195371 11/1984 Japan .
59-195372 11/1984 Japan .
59-227061 12/1984 Japan .
59-227062 12/1984 Japan .
60-769    1/1985 Japan .
60-1643   1/1985 Japan .
60-10449  1/1985 Japan .

*Primary Examiner*—A. J. Heinz
*Attorney, Agent, or Firm*—Wenderoth, Lind & Ponack

[57] ABSTRACT

A magnetic recording and/or reproducing apparatus has incorporated therein a tape cassette adapter which can house therein a small tape cassette and which has a mechanism for drawing out a magnetic tape from the small tape cassette to attain nearly the same tape travel path to that of a large tape cassette in order to load the magnetic tape on a tape drive mechanism. The tape cassette adapter can have a position that it will not interfere with the loading and unloading of the large tape cassette, a position where at least a part of the tape cassette adapter is projected outside from the apparatus so that the small tape cassette can be housed into or removed from the adapter, and a position where the drawn-out magnetic tape is driven by a tape drive mechanism of the apparatus. Either the small or large tape cassette can be easily loaded on or unloaded from the apparatus.

10 Claims, 12 Drawing Sheets

APPARATUS FOR SELECTIVELY LOADING SMALL OR LARGE TAPE CASSETTES

BACKGROUND OF THE INVENTION

1. Field of the Invention

This invention relates to a magnetic recording and/or reproducing apparatus that can accept tape cassettes of two different sizes with a built-in tape cassette adapter, which allows a small-size magnetic tape cassette to be used in an apparatus special for large-size tape cassettes.

2. Description of the Prior Art

The conventional magnetic recording and/or reproducing apparatus has a construction with a tape slot on the front panel, through which a first magnetic tape cassette is inserted. To use a second tape cassette which contains shorter magnetic tape and is smaller in size than the first tape cassette, such a tape cassette adapter that the applicant has already proposed in U.S. Pat. No. 4,479,618 is used to house therein the second tape cassette. After drawing out the magnetic tape contained in the second tape cassette with a tape draw-out means built in the tape cassette adapter to attain the nearly equivalent tape travel path to that of the first cassette tape, the tape cassette is placed in the tape cassette slot provided on the front panel, and recording and/or reproduction of signals are performed in the same manner as the first tape cassette does.

In the magnetic recording and/or reproducing apparatus of the conventional construction, the tape cassette adapter is stored outside of the magnetic recording and/or reproducing apparatus. Therefore, to use the second tape cassette, the tape cassette adapter, to which the second tape cassette is installed, must be first found in the storage place, and the tape cassette adapter can be used only after the magnetic tape contained in the second tape cassette is drawn out to attain the nearly equivalent tape travel path to that of the first tape cassette.

To replace the second tape cassette, the tape cassette adapter must be removed from the apparatus, and the second tape cassette is removed from the tape cassette adapter, then a new second tape cassette is installed to the tape cassette adapter, and finally the tape cassette adapter is again inserted to the tape cassette slot. Consequently, to use the second tape cassette, there was a problem of extremely poor operability.

To partly improve such defect, as disclosed in U.S. Pat. No. 4,622,605, an apparatus has been proposed that allows the tape cassette adapter to be retained in the apparatus when the second tape cassette is used, and the second tape cassette to be replaced from the cassette slot specially provided for the second tape cassette at the upper part of the apparatus. However, in this apparatus, to use the first tape cassette, the tape cassette adapter must be removed from the apparatus and stored outside, requiring an operation to reinstall the adapter again to the apparatus to use the second tape cassette. Thus, this apparatus also had the same problem of poor operability to use the first and second tape cassettes alternately.

SUMMARY OF THE INVENTION

Therefore, an object of the present invention is to provide a magnetic recording and/or reproducing apparatus which allows direct loading of a second tape cassette which is smaller in size than a first tape cassette, and from which a tape cassette adapter needs not be removed when the first tape cassette is in use.

Another object of the present invention is to form a tape draw-out means in the tape cassette adapter and to draw out the magnetic tape in the second tape cassette to form the nearly equivalent tape travel path to that of the first tape cassette during loading the second tape cassette to the apparatus, thereby eliminating time to wait for drawing out the magnetic tape from the second tape cassette.

Still another object of the present invention is to move the tape cassette adapter selectively either to a position to load the tape cassette adapter to a tape drive mechanism or to a position where the cassette adapter does not interfere with loading and unloading operation of the first tape cassette.

A further object of the present invention is to supply a magnetic recording and/or reproducing apparatus in which only installing the first and second tape cassettes through the cassette slot provided on the front panel allows the cassette to be loaded on the tape drive mechanism.

These objects can be accomplished by a magnetic recording and/or reproducing apparatus which has therein: a type cassette adapter for housing therein the second tape cassette and having a tape draw-out mechanism for drawing out a magnetic tape from the second tape cassette so as to form a tape travel path which is substantially the same as that of the first tape cassette; a tape drive mechanism for driving the magnetic tape in the first tape cassette or the magnetic tape in the second tape cassette housed in the tape cassette adapter; a loading mechanism for loading on the tape drive mechanism the first tape cassette or the tape cassette adapter having housed therein the second tape cassette; and a moving mechanism for moving the tape cassette adapter to a position where the tape cassette adapter will not interfere with the loading and unloading operations of the first tape cassette.

The tape cassette adapter is reversibly movable to the position where it does not affect the loading and unloading of the first tape cassette, to a position where at least a part of the tape cassette adapter is projected out of the apparatus so that the second tape cassette can be housed into or removed from the adapter, and to a position where the tape cassette adapter is loaded on the tape drive mechanism.

The above and other objects, features and advantages of the present invention will become more apparent from the following detailed description taken in connection with the accompanying drawings, in which:

BRIEF DESCRIPTION OF THE DRAWINGS

FIG. 1 is perspective view showing a magnetic recording and/or reproducing apparatus of the first preferred embodiment of the present invention;

FIG. 2 is a perspective view showing the apparatus when it is ready to load the second tape cassette;

FIG. 3 is a side view of the principal part showing the condition of the first tape cassette inserted to the apparatus;

FIG. 4 is a side view of the principal part showing the condition when the first tape cassette is loaded on the tape drive mechanism;

FIG. 5 is a side view of the principal part showing the condition when the apparatus is in a stop state;

FIG. 6 is a side view of the principal part showing one condition when the mode shifts to the condition allowing the use of the second tape cassette;

FIG. 7 is a side view of the principal part, which is shown in FIG. 2, showing the condition ready for loading the second tape cassette;

FIG. 8 is a side view of the principal part when the second tape cassette is being loaded on the tape drive mechanism;

FIG. 9 is a side view of the principal part when the second tape cassette has been loaded on the tape drive mechanism;

FIG. 10 is a cam chart showing cam strokes of the first grooved cam 22 and the second grooved cam 23 provided on the cam gear 20;

FIG. 11 is a plan view schematically showing the internal construction of the tape cassette adapter to house the second tape cassette and to pull out the magnetic tape in the tape travel path nearly equivalent to that of the first tape cassette;

FIG. 12 is a perspective view showing the second tape cassette housed in the tape cassette adapter of FIG. 11;

FIG. 13 is a perspective view showing a magnetic recording and/or reproducing apparatus of the second preferred embodiment of the present invention;

FIG. 14 is a side view of the principal part showing the condition when the first tape cassette is inserted in the apparatus;

FIG. 15 is a side view of the principal part showing the condition when a part of the tape cassette adapter is extruded from the apparatus to load the second tape cassette;

FIG. 16 is a plan view of the principal part showing the tape cassette adapter and the first tape cassette loading/unloading mechanism shown in FIGS. 14 and 15;

FIG. 17 is a perspective view showing a magnetic recording and/or reproducing apparatus of the third preferred embodiment of the present invention;

FIG. 18 is a side view of the principal part showing the condition when the first tape cassette is in use;

FIG. 19 is a side view of the principal part showing the condition when the second tape cassette is inserted in the apparatus;

FIG. 20 is a side view of the principal part showing the condition when the second tape cassette is housed in the tape cassette adapter;

FIG. 21 is a plan view schematically showing a tape draw-out mechanism provided at the lower half of the tape cassette adapter; and FIG. 22 is a front view of the principal part of the tape cassette adapter as viewed in the direction of arrow X in FIG. 19.

DETAILED DESCRIPTION OF THE PREFERRED EMBODIMENTS

Figure 1:
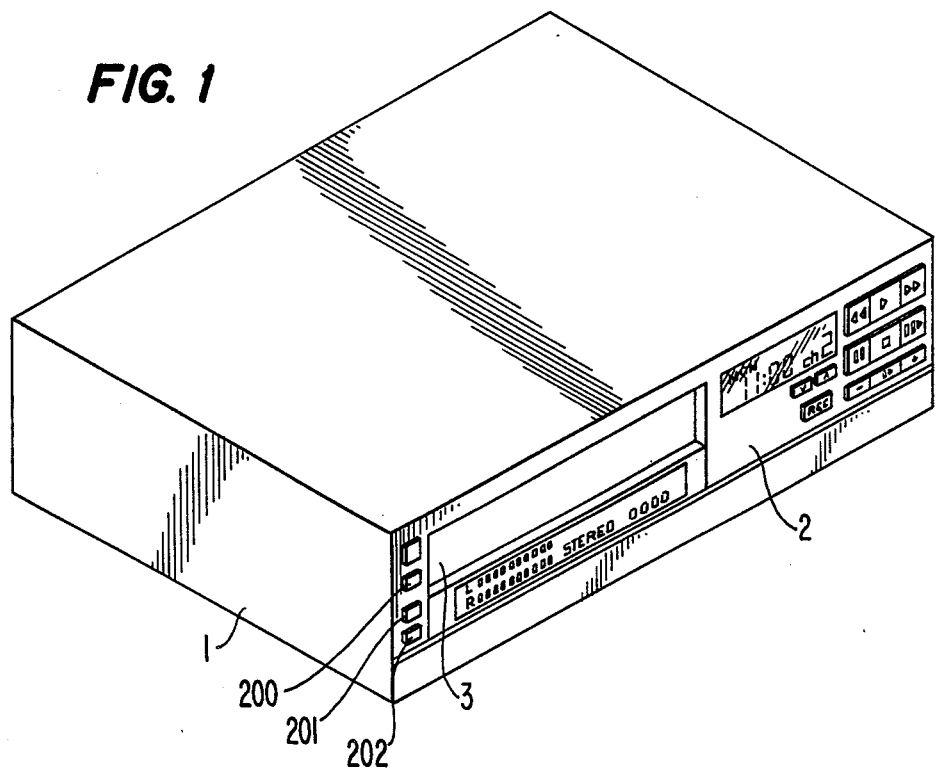
FIGS. 1 through 12 show a first preferred embodiment of the present invention.

Referring now to the drawings, the first preferred embodiment of the present invention will be described in detail hereinafter.

Figure 2:
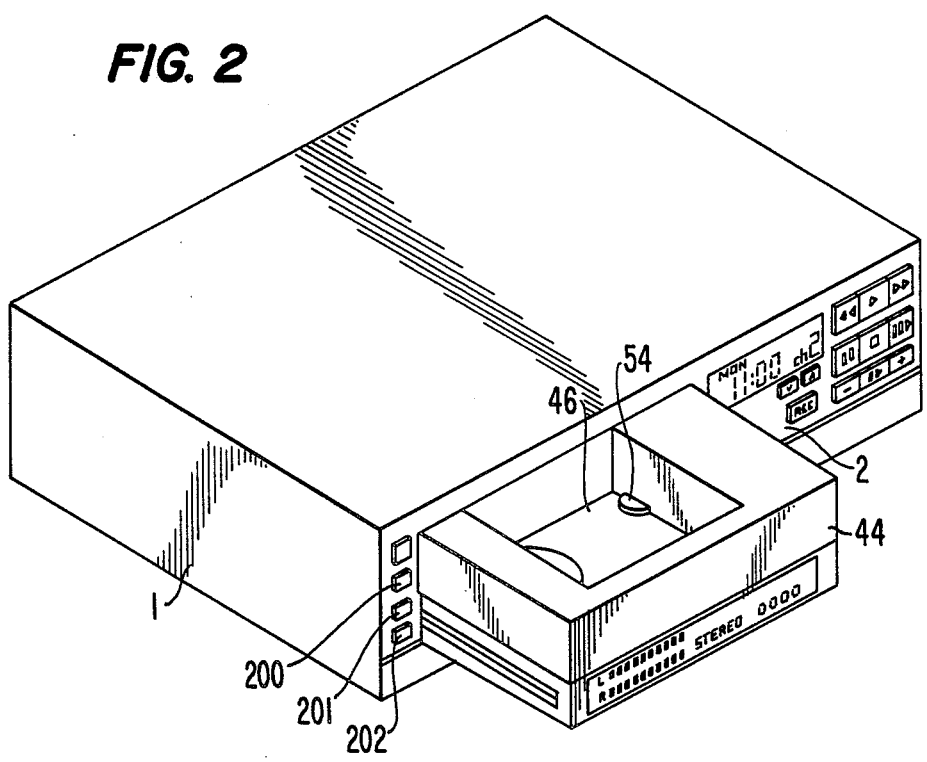

FIGS. 1 and 2 are perspective views showing a magnetic recording and/or reproducing apparatus 1 according to the first embodiment of the present invention. The magnetic recording and/or reproducing apparatus 1 has a tape cassette slot 3 on its front panel 2. FIGS. 3 through 9 are side views of the first tape cassette loading and adapter moving mechanisms incorporated in the apparatus 1. In FIGS. 3 through 9, a cassette holder 7 is movably provided between vertical support plates 5, 6 fixed nearly vertically on the right and left side of a chassis 4 respectively. Protrusions 8 and 9 of the cassette holder 7 is slidably linked to the guide grooves 10 and 11 provided respectively in the vertical support plates 5, 6. The protrusion 8 is further slidably linked to a groove 14 of a drive arm 13 rotatably supported by a shaft 12 which is fixed at both ends to the external surfaces of the vertical support plate 5, 6. A gear 15 of the drive arm 13 engages with a transmission system connected to a known drive motor (not illustrated) for driving the cassette holder 7 so that the drive arm 13 turns with the rotation of the drive motor. A worm gear 18 securely fixed to a shaft 17 of an adapter moving mechanism drive motor 16, which is securely fixed to the right vertical support plate 5, engages with a gear 21 of a cam gear 20, which is rotatably mounted on a shaft 19 provided on the vertical support plate 5. On one surface of the cam gear 20, a first grooved cam 22 is formed, and on the other surface a second grooved cam 23 is formed. To the first grooved cam 22, a cam follower 25 provided on a slide lever 24 slidably supported by the vertical support plate 5 is linked, thereby allowing the slide lever 24 to slide. A rack 26 formed on the slide lever 24 engages with a gear 27 which is rotatably mounted on the vertical support plate 5 and which further engages with a rack 29 of a slide lever 28 slidably supported by the vertical support plate 5. With the rack 29 of the slide lever 28, a gear 30 rotatably mounted on the vertical support plate 5 engages so that the rotation of the gear 30 is transmitted to a gear 32 rotatably mounted on the vertical support plate 5 via a gear train 31. With the gear 32, a rack 34 of a front holder 33 engages so that the front holder 33 slides in accordance with the stroke of the first grooved cam 22. To the second grooved cam 23, a cam follower 36 of a slide lever 35 slidably supported by the vertical support plate 5 is linked so that the slide lever 35 slides in accordance with the stroke of the second grooved cam 23.

With a rack 37 formed on the slide lever 35, a gear 38 rotatably mounted on the vertical support plate 5 engages so that the rotation of the gear 38 is transmitted to a gear 41 rotatably mounted on a frame plate 40 via a gear 39 which is rotatably mounted on the vertical support plate 5. The gear 41 further engages with a rack 43 of an adapter holder 42 slidably supported by the frame plate 40. Thus, the adapter holder 42 can slide in accordance with the stroke of the second grooved cam 23.

Figure 11:
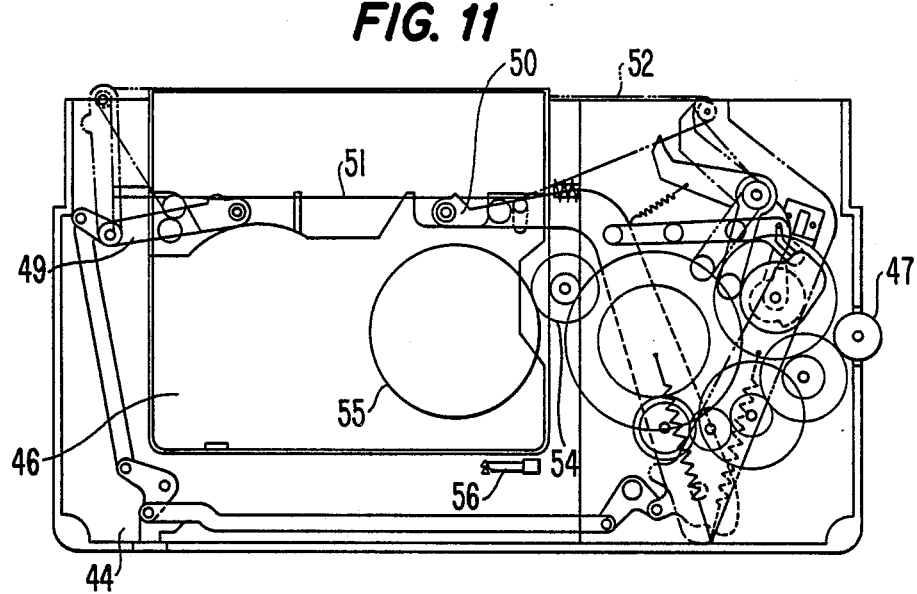

FIG. 11 shows a construction of an adapter 44 for the second tape cassette 45, which is incorporated in the apparatus. A gear 47 rotatably supported by the adapter 44 engages with a rack 48 of the vertical support plate 5. The gear 47 rotates counterclockwise when the adapter 44 moves from the condition of FIG. 5 to that of FIG. 7, and clockwise when the adapter 44 moves from the condition of FIG. 7 to that of FIG. 5. Because the internal construction of the adapter 44 is well known as the VHS-C cassette adapter, details are not described herein, but the adapter is constructed in such a manner that when the gear 47 rotates clockwise in FIG. 11, a magnetic tape 51 is drawn out from the second tape cassette by turnable arms 49 and 50 and forms a tape loop 52 shown by a dot-and-dash line, which is the same as that of the first tape cassette 53. When the gear 47 rotates counterclockwise, the turnable arms 49 and 50 go into the condition as shown by a solid line and a dash line from the condition as shown by dot-and-dash line, thereby contracting the tape loop as well as driving a take-up reel 55 in the second tape cassette 45 to house the magnetic tape in the second tape cassette.

Figure 3:
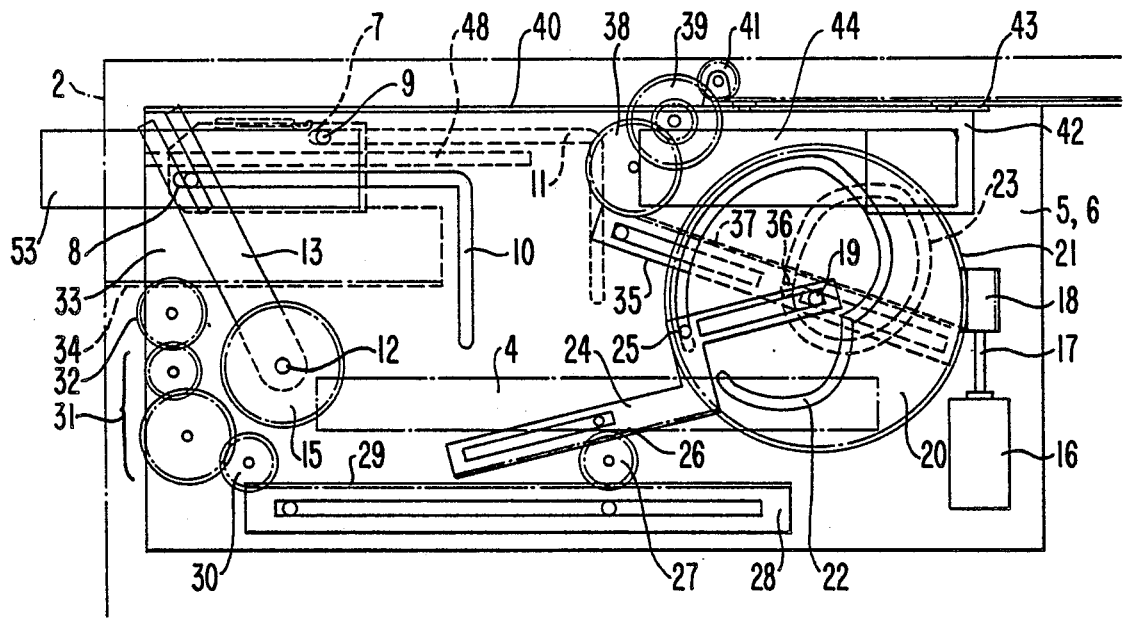
Figure 4:
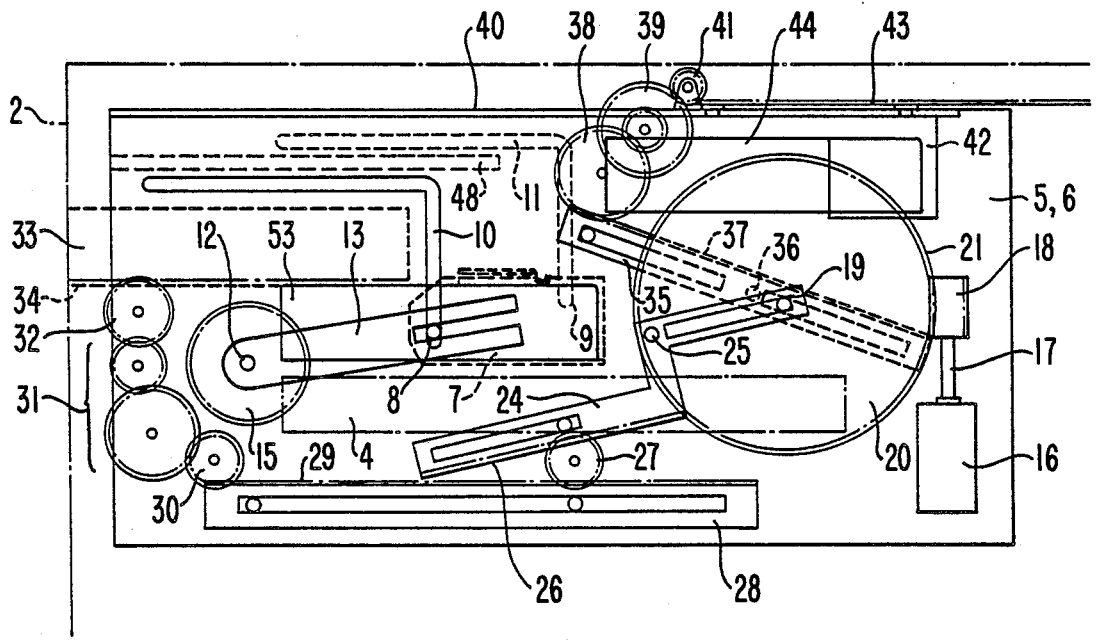

Hereinafter, operations will be described in due order. To load the first tape cassette 53 to the apparatus, the first tape cassette 53 is first inserted in the cassette slot 3 shown in FIG. 1, resulting in the condition as shown in FIG. 3. In FIG. 3, the first tape cassette 53 is held by the cassette holder 7. When a known cassette detection switch (not illustrated) installed in the cassette holder 7 detects the insertion of the first tape cassette 53, the drive arm 13 is driven to rotate clockwise as shown in FIG. 3, so that the cassette holder 7, which is linked to the drive arm 13 at the groove 14 and protrusion 8, is guided by the guide grooves 9 and 10 to slide to be loaded on the apparatus as shown in FIG. 4. To remove the first tape cassette 53 from the apparatus 1, operation of an eject button 203 causes the known drive motor (not illustrated) to drive the drive arm 13 to rotate counterclockwise, shifting from the condition of FIG. 4 to that of FIG. 3, reversely to the loading operation. At this time, the operator can grasp a part of the first cassette tape 53 protruded from the apparatus front panel 2 and take it out from the apparatus.

Next, description will be made on how to load the second tape cassette to the apparatus. In the condition shown in FIG. 5, operating a second tape cassette mode selector button 200 causes a motor 16 to rotate, allowing the cam gear 20 to rotate counterclockwise with the driving force of the motor 16. The cam gear 20 is provided with the first grooved cam 22 and the second grooved cam 23 formed to have the strokes as shown in the timing chart of FIG. 10.

When the cam gear 20 rotates from 0° to 110° counterclockwise, only the second grooved cam 23 has a stroke for driving the slide lever 35.

Figure 5:
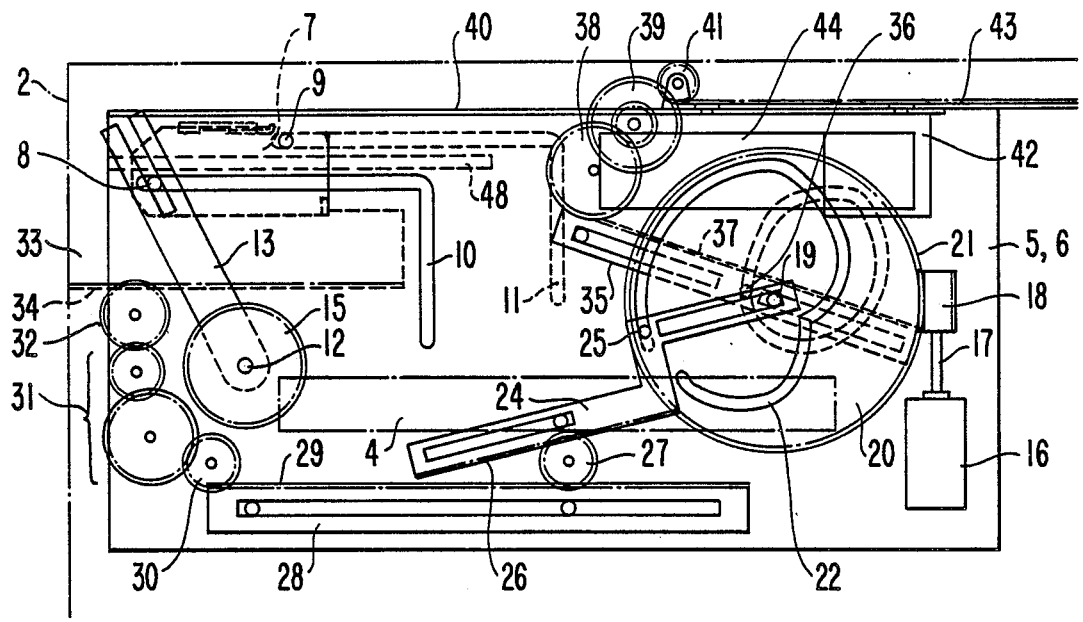

Sliding of the slide lever 35 rotates the gear 38 clockwise, and the rotation is transmitted via gear 39 as a clockwise rotation of the gear 41. The clockwise rotation of the gear 41 slides the adapter holder 42 engaged with the gear 41 at the rack 43 to the left as shown in FIG. 5 while holding the adapter 44, and the adapter holder 42 attains the condition shown in FIG. 6 when the rotation angle of cam gear is 110°. At this point, a known adapter retaining mechanism (not illustrated) is released, disengaging the adapter holder 42 and simultaneously allowing the front holder 33 to hold the adapter 44 with the adapter retaining mechanism provided at the front holder 33.

Then, referring to FIG. 6, description will be made when the cam gear 20 rotates counterclockwise and the rotation angle of cam gear 20 changes from 110° to 220°.

Figure 10:
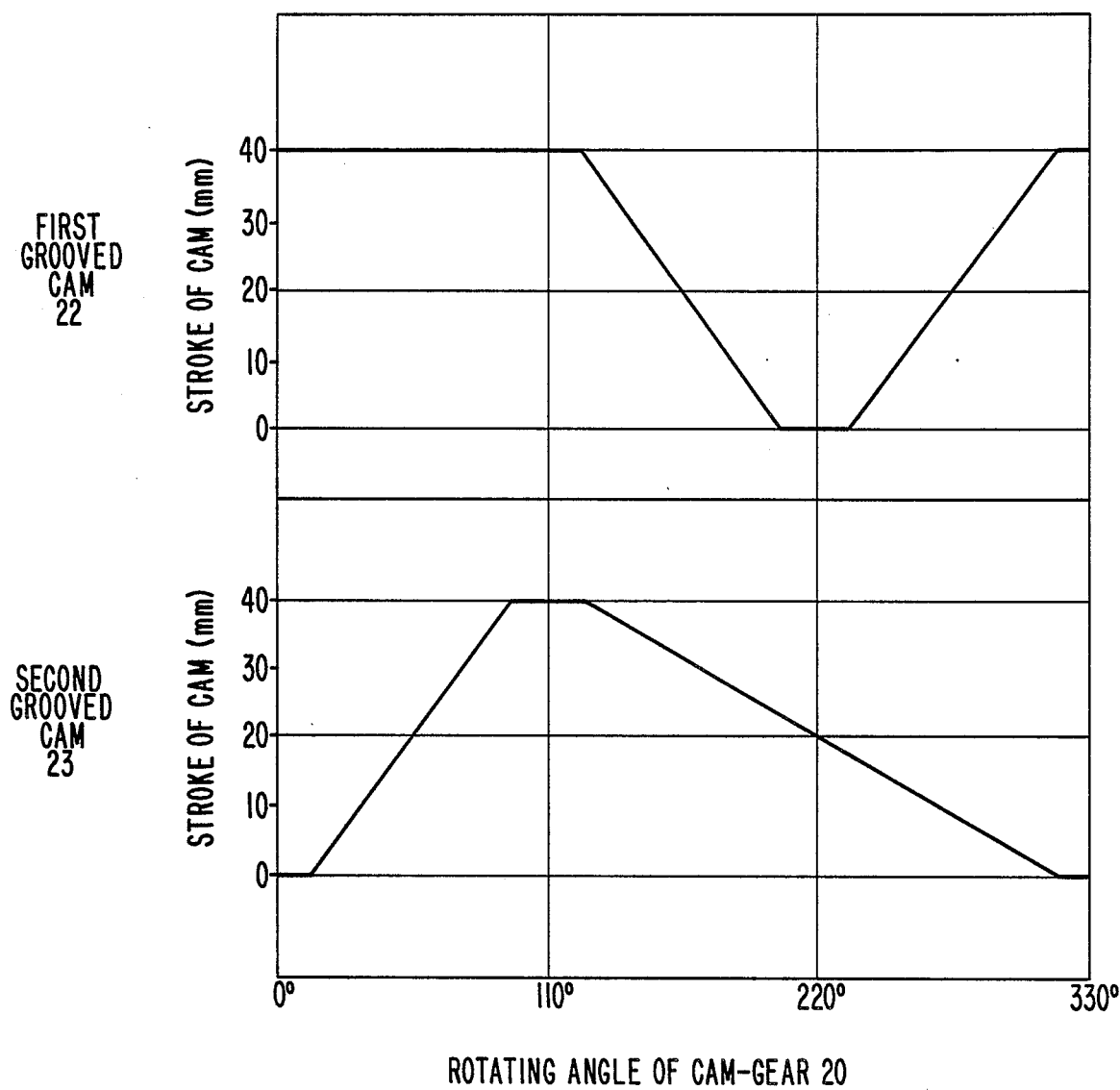

As shown in FIG. 10, the first grooved cam 22 has a 40 mm stroke and drives the slide lever 24. The sliding of the slide lever 24 is transmitted via the gear 27 as the leftward sliding of the slide lever 28. The sliding of the slide lever 28 drives the gear 30 to rotate clockwise, and the clockwise rotation of the gear 30 is transmitted as a counterclockwise rotation of the gear 32 via the gear train 31.

Figure 6:
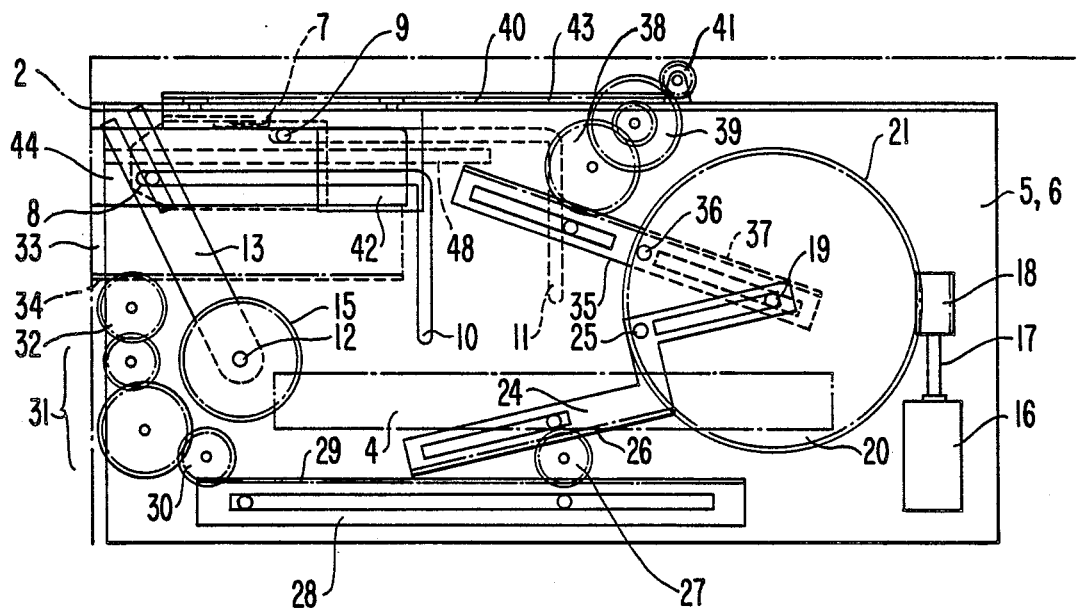

The front holder 33 engages with the gear 32 at the rack 34 and is supported by the vertical support plates 5, 6 slidably to the right and the left as shown in FIG. 6. Therefore, the counterclockwise rotation of the gear 32 slides the adapter 44 held by the front holder 33 to the left as shown in FIG. 6 to the position shown in FIG. 7, where the rotation angle of the cam gear 20 becomes 220°. On the other hand, the second grooved cam 23 has a 20-mm stroke when the rotation angle of the cam gear 20 changes from 110° to 220° as shown in FIG. 10.

Figure 7:
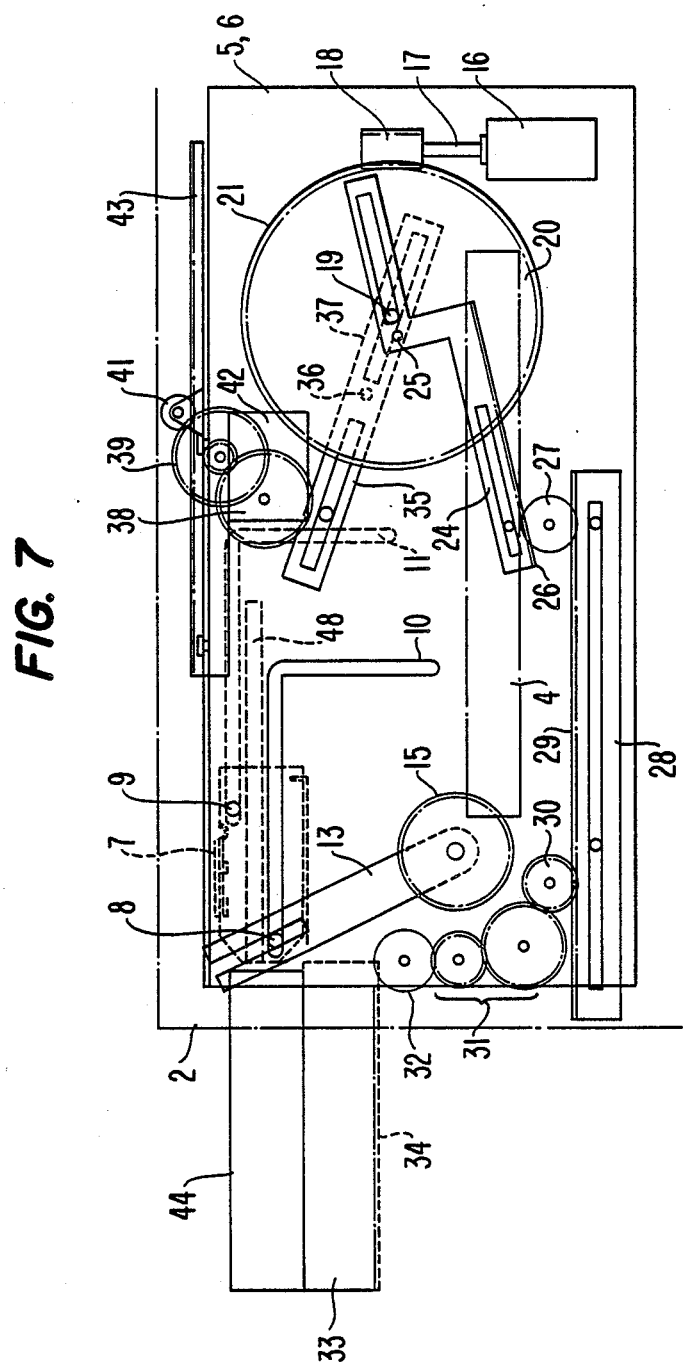

Consequently, the second grooved cam 23 drives the slide lever 35 to slide to the right as shown in FIG. 6, so that the gear 38 engaged with the rack 37 of the slide lever 35 is driven to rotate counterclockwise. The counterclockwise rotation of the gear 38 is transmitted as a counterclockwise rotation of the gear 41 via the gear 39. The adapter holder 42 engaged with the gear 41 at the rack 43 moves to slide to the right as shown in FIG. 6 by the counterclockwise rotation of the gear 41. As shown in FIG. 10, the second grooved cam 23 has one half the total stroke when the rotation angle of the cam gear 20 changes from 110° to 220°, and the adapter holder 42 moves to an intermediate position of the adapter holder 42 shown in FIGS. 5 and 6 at the rotation angles 220° of the cam gear 20 as shown in FIG. 7. In addition, the rack 48 provided on the internal surface of the vertical support plate 5 engages with the gear 47 of the adapter 44 shown in FIG. 11, while the adapter 44 is moving from the position shown in FIG. 5 to that shown in FIG. 7. As the result, the turnable arms 49 and 50 within a second tape cassette accommodating part 46, which were open at the position of FIG. 5 as shown by the dot-and-dash line in FIG. 11, are changed to the position of FIG. 7 as shown by the solid line in FIG. 11.

FIG. 2 is the perspective view of the condition shown in FIG. 7. This condition allows the second tape cassette 45 as shown in FIG. 2 to be housed in the second tape cassette accommodating part 46. To stop using the second tape cassette 45, operating an adapter housing button 201 without placing the second tape cassette 45 to the accommodating part 46 reverses the above-described operations, thereby moving the adapter 44 from the condition of FIG. 7 to that of FIG. 5 via the condition of FIG. 6.

To load the second tape cassette 45 to the apparatus, place the second tape cassette 45 in the accommodating part 46 shown in FIG. 2 and operate the adapter housing button 201. Loading operation of the adapter 44 containing the second tape cassette to the apparatus will be described below.

Figure 8:
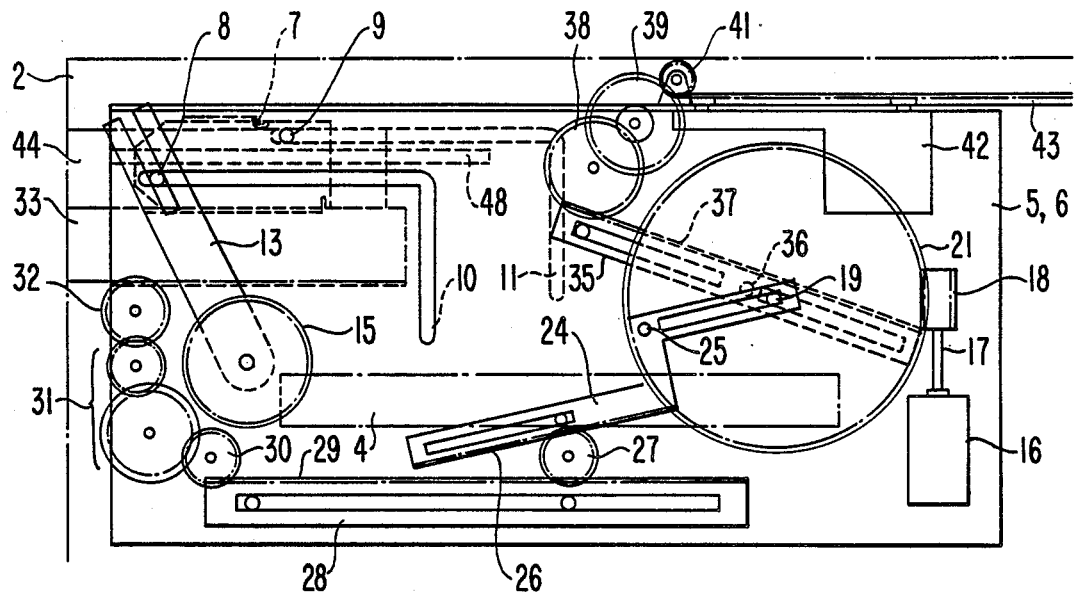
Figure 9:
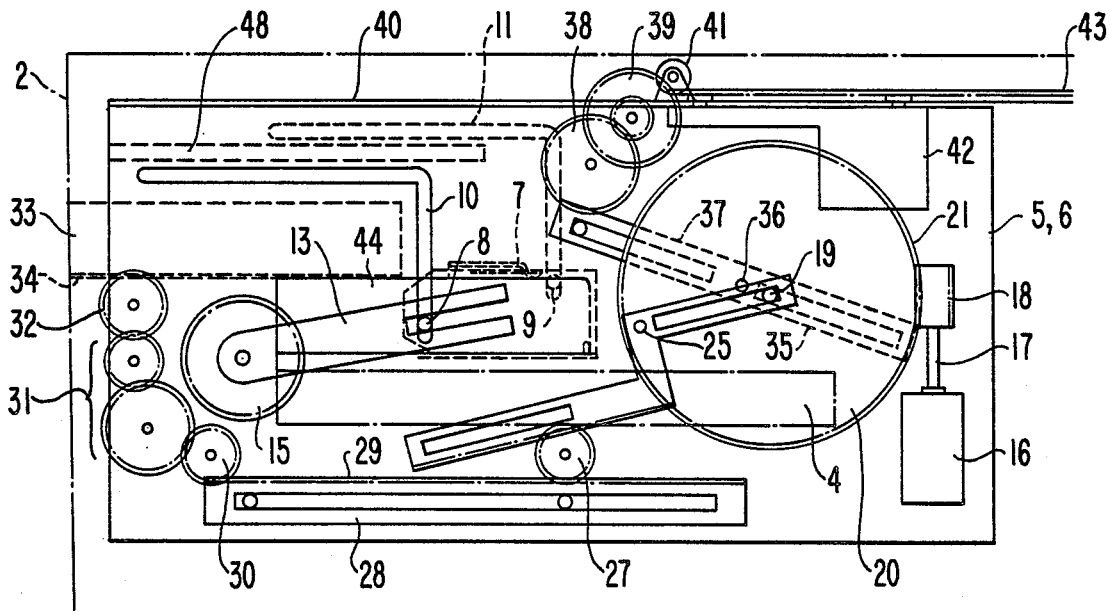

A detection switch 56 is provided in the adapter 44 to detect the second tape cassette 45 being loaded on the adapter 44 as shown in FIG. 11. By detecting the second tape cassette 45 being housed in the adapter 44 and by operating the adapter housing button 201, the motor 16 rotates to allow the cam gear 20 to rotate counterclockwise from the rotation angle 220° to 330°. As shown in FIG. 10, the first grooved cam has in an rotation angle range from 220° to 330° an opposite stroke to that in the range from 110° to 220° described before, so that the adapter 44 held by the front holder 33 moves from the position shown in FIG. 7 to that shown in FIG. 8 by reversing the operation described when the rotation angle changes from 110° to 220°. At this time, the rack 48 of the vertical support plate 5 links with the gear 47 of the adapter 44, thereby causing the turnable arms 49 and 50 to draw out the magnetic tape from the second tape cassette 45 as shown by the dot-and-dash line in FIG. 11. At this moment, a known adapter holding means (not illustrated) provided at the front holder 33 is released, disengaging the linkage between the front holder 33 and adapter 44, and the adapter 44 is held by the first tape cassette holder 7. In rotation angle range of the cam gear 20 from 220° to 330° the second grooved cam 23 has a 20-mm stroke in the direction in which the cam stroke reduces to zero as shown in FIG. 10. The slide lever 35 is driven to slide to the right in FIG. 7 by the second grooved cam 23, and the slide movement of the slide lever 35 is transmitted to the rack 43 of the adapter holder 42 via the gears 38, 39, and 41, thereby moving the adapter holder 42 from the position shown in FIG. 7 to that shown in FIG. 8. When the condition of FIG. 8 is attained (in which the rotation angle of cam gear 20 is 330°), the motor 16 stops rotation, and then the known cassette holder drive motor (not illustrated) begins rotating. This causes the drive arm 13 to turn clockwise, thereby guiding the cassette holder 7 linked with the drive arm 13 at the protrusion 8 along the guide grooves 10 and 11. Through sliding, the adapter 44 moves from the position shown in FIG. 8 to that shown in FIG. 9, so that the adapter 44 having housed therein the second tape cassette 45 is loaded on the apparatus.

Next, description will be made on the case to remove the second tape cassette 45 from the apparatus. Operating a second tape cassette eject button 202 in the condition of FIG. 9 shifts the condition shown in FIG. 9 to that shown in FIG. 7 via the condition shown in FIG. 8 reversely to the second tape cassette loading operation. As described before, at the position of FIG. 7, the second tape cassette 45 can be loaded to and unloaded from the adapter 44, and the second tape cassette 45 can be taken out from the apparatus. To load a new second tape cassette to the apparatus, by loading the said second tape cassette to the accommodating part 46 of the adapter 44 and by operating the adapter housing button 201 the adapter 44 moves from the position of FIG. 7 to that of FIG. 9 through the aforementioned steps, thereby loading the new second tape cassette to the apparatus.

If a new second tape cassette is not loaded, operating the adapter housing button 201 allows the detection switch 56 to detect non-loading of the second tape cassette to the adapter 44, thereby moving the adapter 44 from the position shown in FIG. 7 to that shown in FIG. 5.

The apparatus 1 waits for the next operation at the position of FIG. 5, and performs aforementioned movements in accordance with respective required operations.

A second preferred embodiment of the present invention will be described hereinafter with reference to appended drawings.

Figure 13:
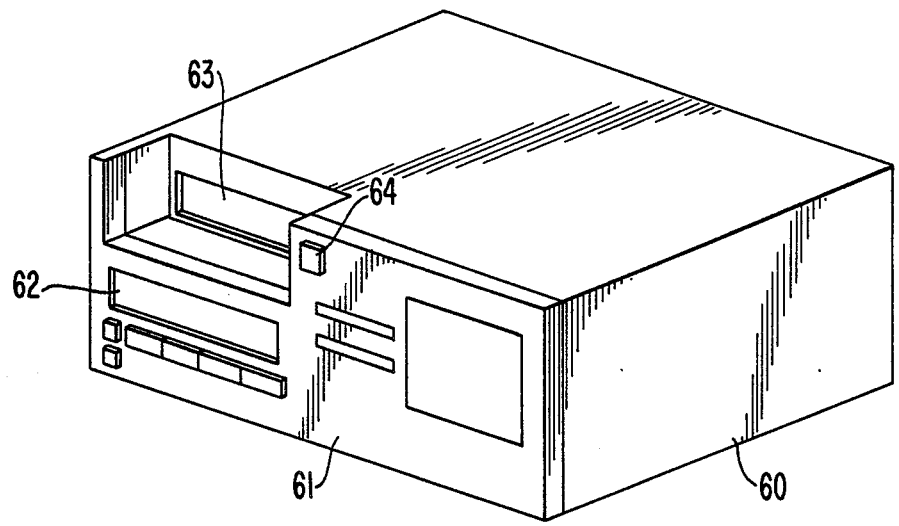
FIGS. 13 through 16 show a second preferred embodiment of the present invention.
Figure 14:
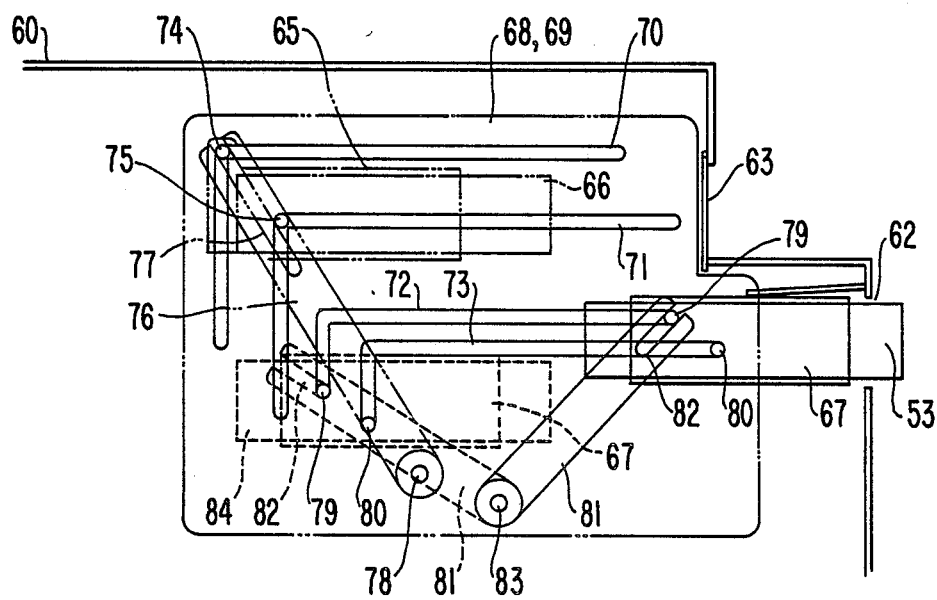
Figure 15:
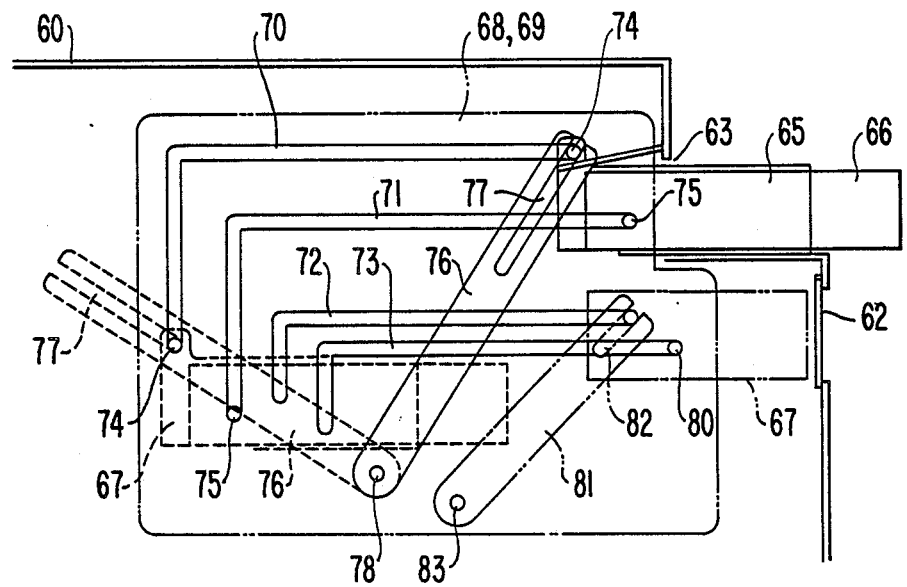
Figure 16:
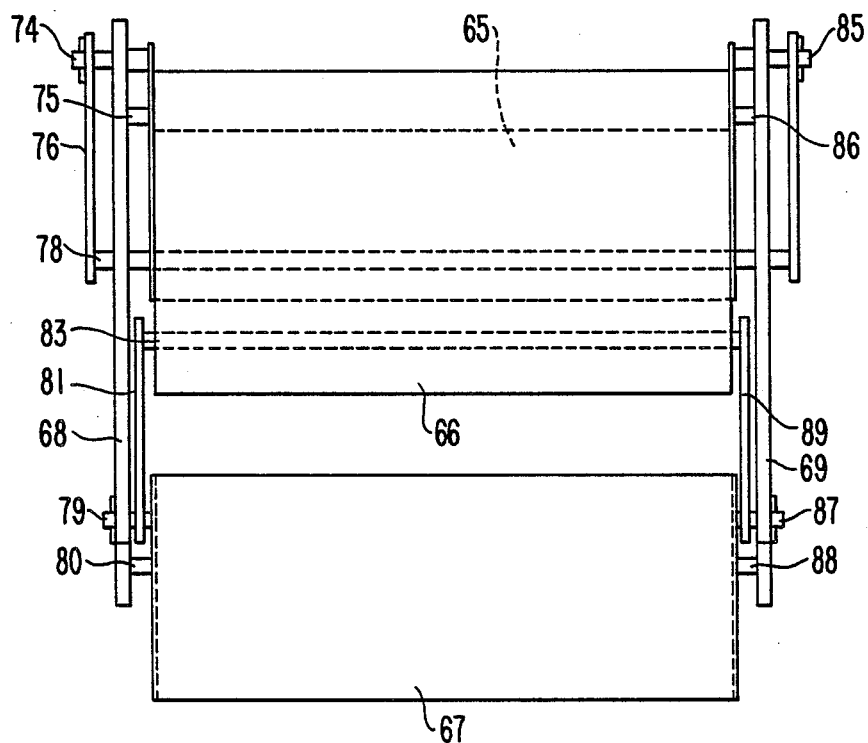

FIG. 13 shows a perspective view of a magnetic recording and/or reproducing apparatus 60 of the second embodiment according to the present invention. FIG. 14 and 15 are side views of the adapter and standard tape cassette loading/unloading mechanism, and FIG. 16 is a plan of the same loading/unloading mechanism.

In FIG. 13, the apparatus 60 has a front panel 61 provided with a first tape cassette slot 62, an adapter entrance 63, and an adapter switch 64 to operate the adapter loading/unloading mechanism. In the apparatus 60, the adapter and the first tape cassette loading/unloading mechanism shown in FIGS. 14 through 16 is formed. In FIGS. 14 through 16, on a vertical support plate 68 are formed adapter guide grooves 70, 71 are formed to guide an adapter holder 65 holding an adapter 66, and cassette holder guide grooves 72, 73 to guide a cassette holder 67. On the adapter holder 65, pins 74, 75 are provided and the pin 74 engages with a groove 77 of an adapter sliding arm 15. The adapter holder 65 slides to be guided along the adapter guide grooves 70, 71 together with the pin 74 sliding through the groove 77 as the adapter sliding arm 15 turns about a fixed adapter synchronizing shaft 78. In the same manner, on the tape cassette holder 67 the pins 79, 80 are provided, and the pin 79 engages with a groove 82 of a cassette holder sliding arm 81. When the cassette holder sliding arm 81 turns about a fixed holder synchronizing shaft 83, the pin 79 slides the groove 82 and at the same time the tape cassette holder 67 slides to be guided along the guide grooves 72, 73.

The operation according to the magnetic recording-/reproducing apparatus composed as above will be described hereinafter with reference to FIGS. 13 through 16.

In FIG. 14, when the tape cassette holder 67 is pushed at the position shown by a solid line where the first tape cassette 53 is inserted in the apparatus 60 from the first tape cassette slot 62, a known detection switch (not illustrated) detects that the first tape cassette 53 is inserted in the tape cassette holder 67. This causes the cassette holder sliding arm 81 to turn counterclockwise about the holder synchronizing shaft 83 by a known drive source (not illustrated) from the position shown by a solid line to the position shown by a broken line in FIG. 14. At this time, by the engagement of the pin 79 provided on the tape cassette holder 67 with the groove 82 of the cassette sliding arm 81, the tape cassette holder 67 is guided to the position shown by the broken line along the first cassette holder guide grooves 72, 73, thereby loading the first tape cassette 53 on the apparatus 60. At this moment, the adapter 66 integral with the adapter holder 65 is located at a position in the apparatus shown in FIG. 14 by a two-dot-and-dash line where they will not interfere with the loading route of the first cassette 53.

Figure 12:
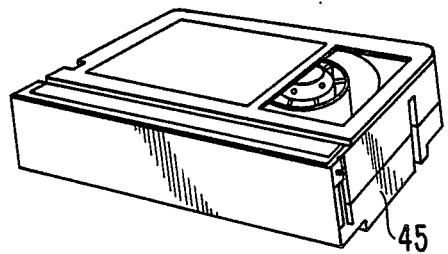

To load the second tape cassette 45 as shown in FIG. 12 to the apparatus 60, depressing the adapter switch 64 on the front panel after taking out the first tape cassette 53 allows the adapter sliding arm 76 to turn clockwise about the adapter synchronizing shaft 78 by a known drive source (not illustrated) from the position shown by a two-dot-and-dash line to that shown by a solid line in FIG. 15. At this time, by the engagement of the pin 74 provided on the adapter holder 65 with the groove 77 of the adapter sliding arm 76, the adapter holder 65 and the adapter 66 move along the adapter guide grooves 70, 71 to a position where a part of the adapter holder 65 and adapter 66 extrudes from the adapter entrance 63 as shown in FIG. 15 by a solid line. Loading the second tape cassette 45 to the adapter 66 causes the detection switch (54 in FIG. 11) to detect the loading of the second tape cassette 45 to the adapter 66, allowing the tape draw-out mechanism in the adapter 66 to draw out the magnetic tape from the second tape cassette 45 so that nearly the same tape loop as that of the magnetic tape in the first tape cassette 53 is formed. Depressing the adapter switch 64 again at this moment causes the adapter sliding arm 76 to turn counterclockwise by the drive source (not illustrated) about the adapter synchronizing shaft 78 to the position shown by the broken line from the position shown by the solid line in FIG. 15. With the engagement of the pin 74 provided on the adapter holder 65 with the groove 77 of the adapter sliding arm 76, the adapter holder 65 and the adapter 66 are guided to the position shown by the broken line in FIG. 15 via the position shown by the two-dot-and-dash line in FIG. 14 along the adapter guide grooves 70, 71, thereby loading the second tape cassette 45 on the apparatus to be ready for the recording or reproducing operation.

To replace the second tape cassette 45 having completed the recording and/or reproducing operations, depressing the adapter switch 64 again causes the adapter sliding arm 76 located at the position shown by the broken in FIG. 15 to turn clockwise with the drive source (not illustrated) about the adapter synchronizing shaft 78 to the position shown by the solid line. This guides the adapter holder 65 and the adapter 66 along the adapter guide grooves 70, 71 to the position shown by the solid line, allowing replacement of the second tape cassette 45.

Depressing the adapter switch 64 when the second tape cassette 45 is not loaded on the adapter 66 which is extruded from the adapter entrance 63 and located at the position shown by the solid line in FIG. 15 causes the adapter sliding arm 76 to turn counterclockwise by the drive source (not illustrated) about the adapter synchronizing shaft 78 from the position shown by the solid line in FIG. 15 and to stop at the position shown by the two-dot-and-dash line in FIG. 14. This guides the adapter holder 65 and the adapter 66 from the position shown by the solid line in FIG. 15 to that shown by the two-dot-and-dash line in FIG. 14 along the adapter guide grooves 70, 71. This position does not interfere with the loading route of the first tape cassette 53, allowing insertion and loading of the first tape cassette 53 to the apparatus 60.

A third preferred embodiment of the present invention will be described hereinafter with reference to the appended drawings.

Figure 17:
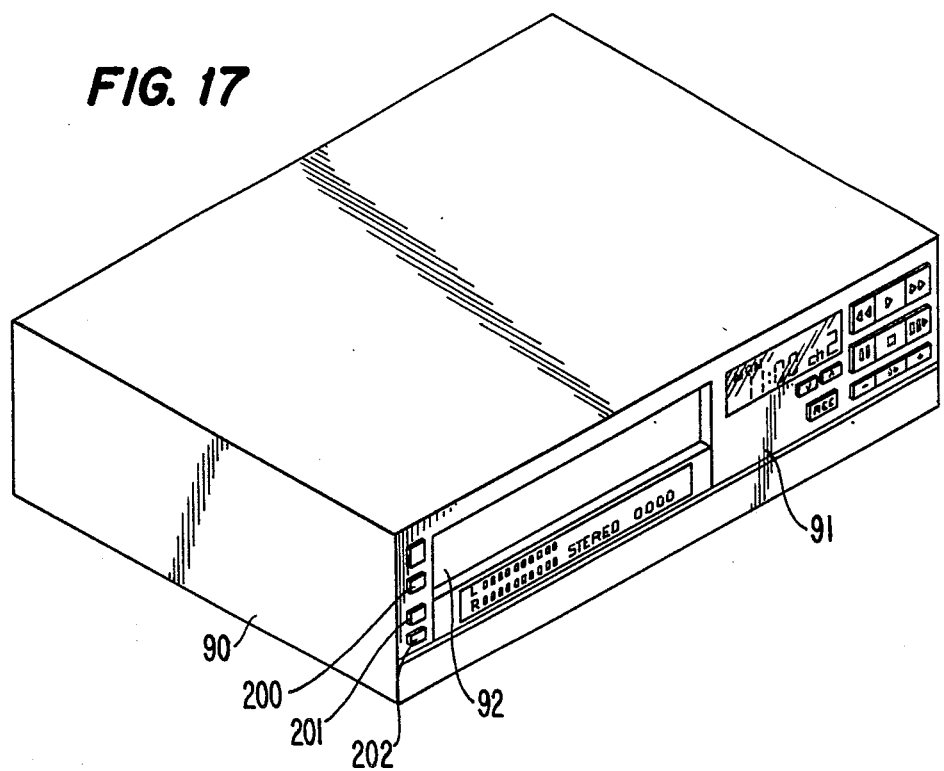
FIGS. 17 through 22 show a third preferred embodiment of the present invention.
Figure 18:
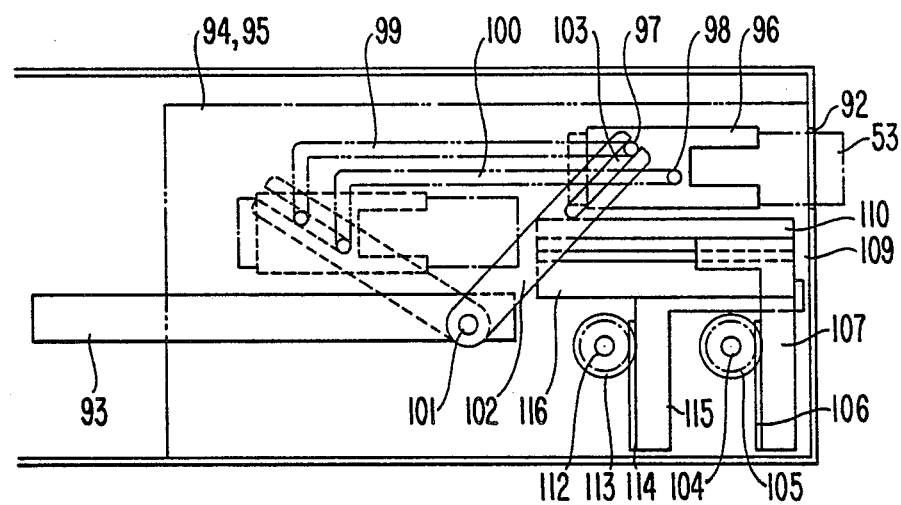
Figure 19:
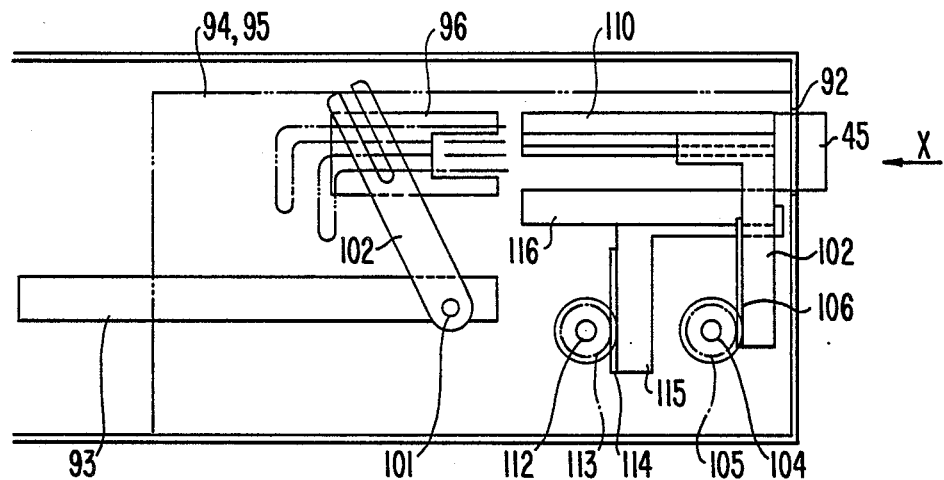
Figure 20:
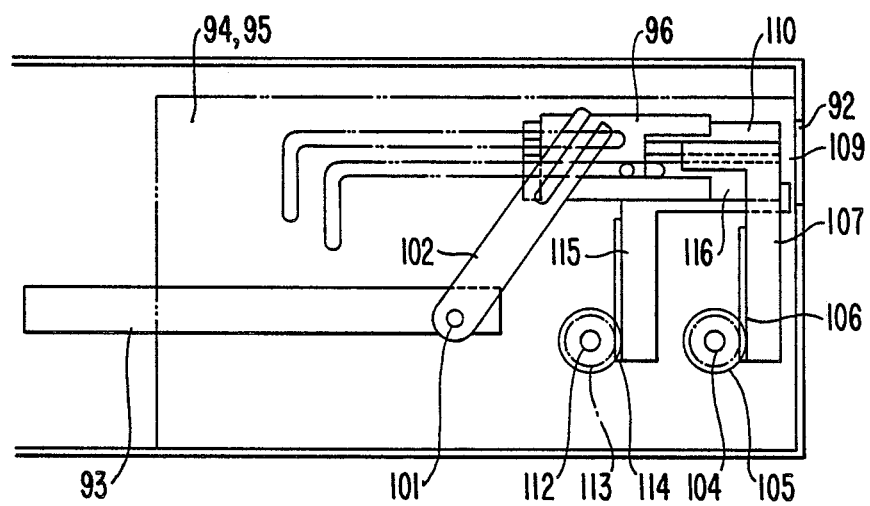

FIG. 17 shows a perspective view of an apparatus 90 of the third embodiment of the present invention as seen obliquely. The magnetic recording and/or reproducing apparatus 90 has a front panel 91 provided with a tape cassette slot 92. FIGS. 18 through 20 are side views of principal part of the first and second tape cassette loading mechanisms incorporated in the apparatus 90. FIGS. 18 through 20 show a cassette holder 96 movably provided between vertical support plates 94, 95 nearly perpendicularly arranged on the right and the left of a tape drive mechanism 93 of the apparatus. Protrusions 97 and 98 of a cassette holder 96 slidably engage with guide grooves 99 and 100 provided on the vertical support plates 94, 95. A protrusion 97 slidably engages with a groove 103 of a drive arm 102 turnably mounted on a shaft 101 fixed at both ends to the vertical support plates 94, 95.

Figure 22:
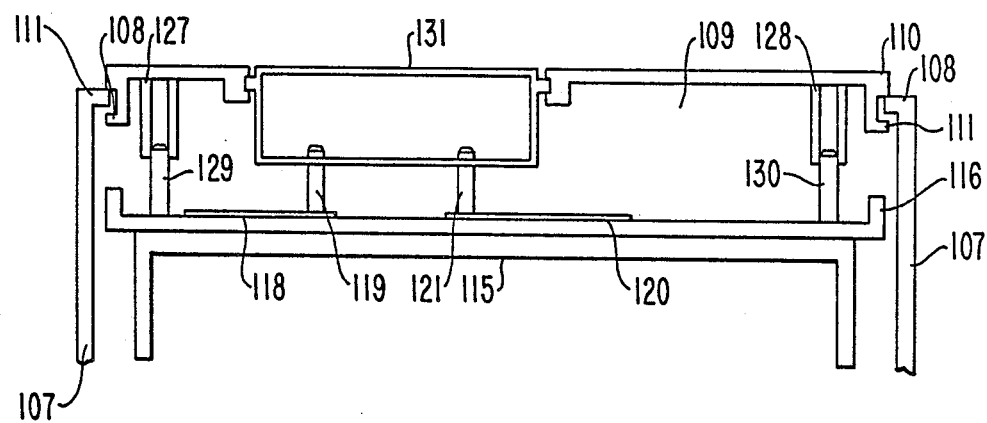

The drive arm 102 is constructed to turn about the shaft 101 by rotation of a known cassette holder drive motor (not illustrated). Counterclockwise rotation of the drive arm 102 in FIG. 18 guides the cassette holder 96 along the guide grooves 99, 100 to move horizontally at first, and then perpendicularly to be close to the tape drive mechanism 93 as shown by a broken line in FIG. 18, thereby loading either the first tape cassette 53 or the second tape cassette 45 to the tape drive mechanism 93. An a shaft 104 provided on the vertical support plates 94, 95 a pinion 105 is mounted. As the pinion 105 rotates, an elevator 107 with a rack 106 meshing with the pinion 105 ascends or descends. As shown in FIG. 22, since a protrusion 108 at an end of the elevator 107 engages with a groove 111 provided on a side surface of an upper half 110 of an adapter 109, the rotation of the pinion 105 allows the upper half 110 to ascend or descend.

In the same manner, on a shaft 112 provided on the vertical support plates 94, 95, a pinion 113 is mounted. Because an elevator 115 having a rack 114 meshing with a pinion 113 carries a lower half 116 of the adapter 109, the elevator 115 and the lower half 116 are designed to ascend or descend as the pinion 113 rotates.

Figure 21:
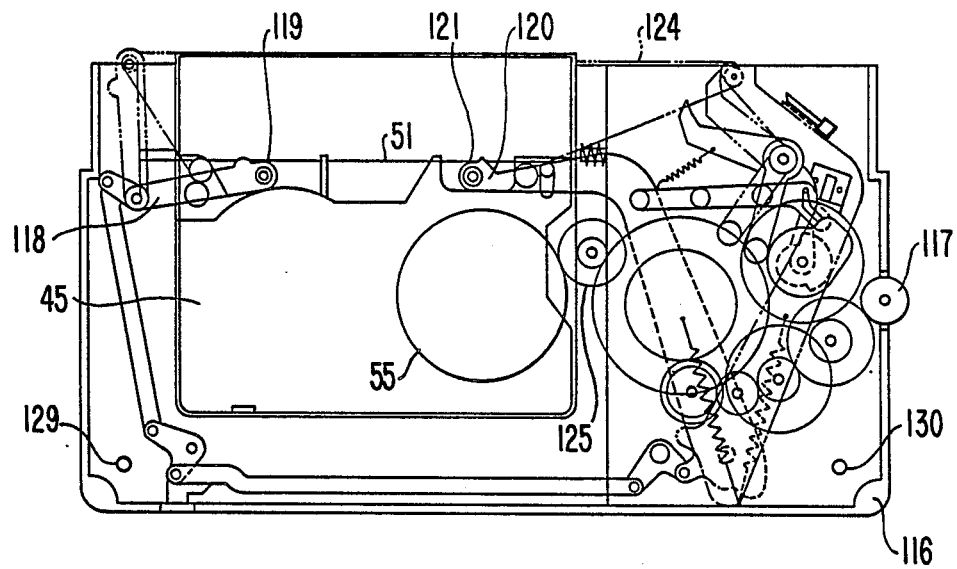

FIG. 21 shows the principal structure of the lower half 116 of the adapter 109 incorporated in the apparatus. A gear 117 rotatably supported by the lower half 116 engages with a rack (not illustrated) of the vertical support plate 95 shown in FIG. 18. When the adapter 109 moves to the left from the condition of FIG. 20, the gear 117 rotates clockwise. When the adapter 109 moves to the right in FIG. 20, the gear 117 rotates clockwise. When the adapter 109 moves to the right in FIG. 20, the gear 117 rotates counterclockwise. Since the internal construction of the adapter 109 is well-known as the VHS-C cassette adapter, details are not particularly discussed, but in FIG. 21 when the gear 117 rotates clockwise, a draw-out pin 119 on a turnable arm 118 and a draw-out pin 121 on a turnable arm 120 draw out the magnetic tape 51 from the second tape cassette 45, to form a similar tape path 124 to that of the first tape cassette 53 as shown by a dot-and-dash line. When the gear 117 rotates counterclockwise, the swing arms 118 and 120 move to the condition shown by a solid line and a broken line to contract the tape loop as well as to drive the take-up reel 55 in the second tape cassette 45, thereby housing the magnetic tape 51 in the second tape cassette 45.

The adapter 109 has a construction to be separated into the upper half 110 and the lower half 116. Bosses 127, 128 provided on the upper half 110 and shafts 129, 130 provided on the lower half 116 prevent horizontal displacement of the relative position of the upper and lower halves. The upper half 110 is arranged in such a manner that a second tape cassette holder 131 holding the second tape cassette 45 slides freely to the right and the left in FIG. 19. The lower half 116 is provided with a tape draw-out mechanism including the aforementioned turnable arms 118, 120 and pull-out pins 119, 121, and a reel drive mechanism to drive the tape reel of the second tape cassette 45. When the second tape cassette 45 is inserted to a specified position of the second tape cassette holder 131 in the state that the upper half 110 and the lower half 116 are separated from each other as shown in FIG. 22, and then the upper half 110 and the lower half 116 are assembled together, the draw-out pins 119 and 121 are positioned behind the magnetic tape 51 at the mouth of the second tape cassette 45 as shown in FIG. 21.

The physical dimensions of the adapter 109 when the upper half 110 and lower half 116 are assembled together are designed to be nearly equal to those of the first tape cassette 53.

Now description will be made on the respective operations with reference to the drawings.

The case to load the first tape cassette 53 to the apparatus will be described. In FIG. 18, inserting the first tape cassette 53 to the cassette slot 92 as shown by the dot-and-dash line in the known conventional manner turns on a known switch (not illustrated), starts a known cassette holder drive motor (not illustrated), and turns the drive arm 102 counterclockwise in FIG. 18 to attain the position shown by the broken line, thereby causing the cassette holder 96 to move to slide, guided by the guide grooves 99, 100, to the position shown by the broken line in FIG. 18. Consequently, the first tape cassette 53 held by the cassette holder 96 is loaded on the tape drive mechanism 93 in the same manner as in a conventional apparatus as shown by the dot-and-dash line in FIG. 18.

Next description will be made on the case to load the second tape cassette 45 to the apparatus.

Depressing a second tape cassette mode selection switch 200 rotates the cassette holder drive motor (not illustrated) so that the cassette holder 96 moves to an intermediate position as shown in FIG. 19.

Then the drive motor (not illustrated) rotates to allow the pinion 105 to rotate counterclockwise in FIG. 19, thereby raising the elevator 107 and the upper half 110 of the adapter 109 to the position shown in FIG. 19 via the rack 106. At the same time the pinion 113 rotates counterclockwise, thereby raising the elevator 115 and the lower half 116 of the adapter 109 via the rack 114 to the position shown in FIG. 19. Heights of the upper half 110 and the lower half 116 shown in FIG. 19 are determined to prevent contact of the draw-out pins 119, 121 with the magnetic tape 51 even if the second tape cassette 45 is inserted in the second tape cassette holder 131 as shown in FIG. 22.

In FIG. 19 the second tape cassette holder 131 is moved to the right in the upper half 110 in order to accept the second tape cassette 45 from the cassette slot 92.

Inserting the second tape cassette 45 into the second cassette holder 131 through the cassette slot 92 under the condition of FIG. 19 turns on the known switch (not illustrated), operating the second tape cassette holder drive mechanism (not illustrated). The second cassette holder 131 moves to the left in FIG. 19 while holding the second tape cassette 45, bringing the flat position relation between the second tape cassette 45 and the lower half 116 into the condition shown in FIG. 21. At this time, the magnetic tape 51 passes through the draw-out pins 119, 121, but as described before, they are positioned to prevent contact one another. Then the pinion 113 rotates further counterclockwise in FIG. 19, and the upper half 110 and the lower half 116 join together to one. At this time, the draw-out pins 119, 121 are inserted behind the magnetic tape 51 at the mouth of the second tape cassette 45. The physical dimensions of the joined adapter 109 are nearly equal to those of the first tape cassette 53. Therefore, reversing the cassette holder drive motor (not illustrated) under this condition to turn the drive arm 102 counterclockwise as shown in FIG. 20 inserts the adapter 109 into the cassette holder 96 as shown in FIG. 20.

Then, rotating again the cassette holder drive motor (not illustrated) to turn the drive arm 102 counterclockwise as shown in FIG. 22 causes the cassette holder 96 to move in the exactly same manner as that when the first tape cassette 53 is loaded. At this time the cassette holder 96 holds the adapter 109 incorporating the second tape cassette 45 and the adapter 109 is loaded on the tape drive mechanism. Consequently, the second tape cassette 45 is loaded on the tape drive mechanism 93. Of course, when the cassette holder 96 moves to the left in FIG. 20 from the condition of FIG. 20, as described before, the draw-out pins 119, 121 are designed to move to the position shown by the dot-and-dash line in FIG. 21. Therefore the magnetic tape travel path provided in the front within the adapter 109 before loading is nearly equal to that of the first tape cassette 53, producing no problem even if the adapter 109 is loaded on the tape drive mechanism 93.

The relation between the tape reel in the second tape cassette 45 and the reel drive mechanism of the tape drive mechanism 93 is designed to be nearly the same as that of the conventional apparatus; therefore the detail is omitted.

As described above, the magnetic recording and/or reproducing apparatus according to the present invention allows the remarkably easy use of first and second tape cassettes.

What is claimed is:

1. A magnetic recording and/or reproducing apparatus for recording and/or reproducing signals using a magnetic tape encased in a tape cassette, wherein, as said tape cassette, both a first tape cassette having encased therein a first magnetic tape and a second tape cassette smaller in size than said first tape cassette and having encased therein a second magnetic tape can be used selectively, said apparatus having:

a tape cassette adapter for housing therein said second tape cassette and having a tape draw-out means for drawing out said second magnetic tape from said second tape cassette so as to attain a tape travel path substantially the same as that of said first tape cassette;

a magnetic tape drive means for driving said first magnetic tape in said first tape cassette or said second magnetic tape in said second tape cassette housed in said tape cassette adapter;

a loading means for loading said first tape cassette or said tape cassette adapter having housed therein said second tape cassette on said magnetic tape drive means; and a moving means for moving said tape cassette adapter to a position where said tape cassette adapter will not interfere with a route to load said first tape cassette on said magnetic tape drive means.

2. A magnetic recording and/or reproducing apparatus according to claim 1, further comprising a driving means for driving said tape draw-out means incorporated in said tape cassette adapter to draw out said second magnetic tape from said second tape cassette when said loading means is loading said tape cassette adapter on said magnetic tape drive means.

3. A magnetic recording and/or reproducing apparatus according to claim 1, further comprising:

a detection means for detecting said second tape cassette being loaded on said tape cassette adapter; and a control means for controlling said loading means to load said tape cassette adapter to said magnetic tape drive means only when said detection means detects the loading of said second tape cassette on said tape cassette adapter.

4. A magnetic recording and/or reproducing apparatus according to claim 1, wherein said loading means comprises a single loading mechanism for loading said first tape cassette or said tape cassette adapter having housed therein said second tape cassette on said magnetic tape drive means.

5. A magnetic recording and/or reproducing apparatus for recording and/or reproducing signals using a magnetic tape encased in a tape cassette, wherein, as said tape cassette, both a first tape cassette having encased therein a first magnetic tape and a second tape cassette smaller in size than said first tape cassette and having encased therein a second magnetic tape can be used selectively, said apparatus having:

a tape cassette adapter for housing therein said second tape cassette and having a tape draw-out means for drawing out said second magnetic tape from said second tape cassette so as to attain a tape travel path substantially the same as that of said first tape cassette;

a magnetic tape drive means for driving said first magnetic tape in said first tape cassette or said second magnetic tape in said second tape cassette housed in said tape cassette adapter;

a tape cassette slot through which said first tape cassette is inserted into said apparatus;

a holding means for holding said first tape cassette at a first position in which said first tape cassette is inserted through said tape cassette slot;

a loading means for moving said holding means holding said first tape cassette between said first position and a second position in which said first tape cassette is loaded on said magnetic tape drive means; and a moving means for moving the said tape cassette adapter selectively to a third position where at least a part of said tape cassette adapter extrudes via said tape cassette slot outward from said apparatus so that said second tape cassette can be housed into or removed from said tape cassette adapter, to a forth position where said tape cassette adapter will not interfere the operation of said loading means that loads said first tape cassette on and unloads said first tape cassette from said magnetic tape drive means, and to a fifth position where said tape cassette adapter is loaded on said holding means located at said first position.

6. A magnetic recording and/or reproducing apparatus according to claim 5, further comprising:

a detection means for detecting said second tape cassette being housed in said tape cassette adapter; and a control means for controlling, when said detection means detects said second tape cassette being housed in said tape cassette adapter, said moving means to move said tape cassette adapter located at said third position to said fifth position to be loaded on said holding means located at said first position and thereafter controlling said loading means to move to said second position by to load said tape cassette adapter on said magnetic tape drive means, and for controlling, when said detection means does not detect said second tape cassette, said moving means to move said tape cassette adapter from said third position to said forth position.

7. A magnetic recording and/or reproducing apparatus according to claim 5, wherein said moving means comprises:

a first moving mechanism for reversibly moving said tape cassette adapter between said third position and said fifth position; and a second moving mechanism for reversibly moving said tape cassette adapter between said forth position and said fifth position.

8. A magnetic recording and/or reproducing apparatus for recording and/or reproducing signals using a magnetic tape encased in a tape cassette, wherein, as said tape cassette, both a first tape cassette having encased therein a first magnetic tape and a second tape cassette smaller in size than said first tape cassette and having encased therein a second magnetic tape can be used selectively, said apparatus having:

a tape cassette adapter for housing therein said second tape cassette and having a tape draw-out means for drawing out said second magnetic tape from said second tape cassette so as to attain a tape travel path substantially the same as that of said first tape cassette;

a magnetic tape drive means for driving said first magnetic tape in said first tape cassette or said second magnetic tape in said second tape cassette housed in said tape cassette adapter;

a tape cassette slot through which said first tape cassette is inserted into said apparatus;

an entrance through which at least a part of said tape cassette adapter can protrude outside from said apparatus;

a first loading means for moving said first tape cassette between a first position where said first tape cassette is inserted through said tape cassette slot and a second position where said first tape cassette is loaded on said magnetic tape drive means; and a second loading means for moving said tape cassette adapter between a third position where said at least said part of said tape cassette adapter protrudes outside of said apparatus through said entrance so that said second tape cassette can be housed into or removed from said tape cassette adapter and a fourth position where said tape cassette adapter is loaded on said magnetic tape drive means.

9. A magnetic recording and/or reproducing apparatus according to claim 8, wherein said second loading means is further movable to a fifth position where said tape cassette adapter will not interfere with the loading and unloading operation of said first tape cassette carried out by said first loading means.

10. A magnetic recording and/or reproducing apparatus for recording and/or reproducing signals using a magnetic tape encased in a tape cassette, wherein, as said tape cassette, both a first tape cassette having encased therein a first magnetic tape and a second tape cassette smaller in size than said first tape cassette and having encased therein a second magnetic tape can be used selectively, said apparatus having:

a tape cassette holding means for holding said second cassette tape;

a tape draw-out means for drawing out said second magnetic tape from said second tape cassette so as to attain a tape travel path substantially the same as that of said first tape cassette;

a tape drive means for driving said first magnetic tape in said first tape cassette or that said second magnetic tape in said second tape cassette;

a first loading means for loading said tape cassette holding means and said tape draw-out means to be in specific relative positions to each other; and a second loading means for holding said tape cassette holding means and said tape draw-out means to be integral with each other in a specific position relative to said magnetic tape drive means.

* * * * *